United States Patent Office 2,830,655
Patented Apr. 15, 1958

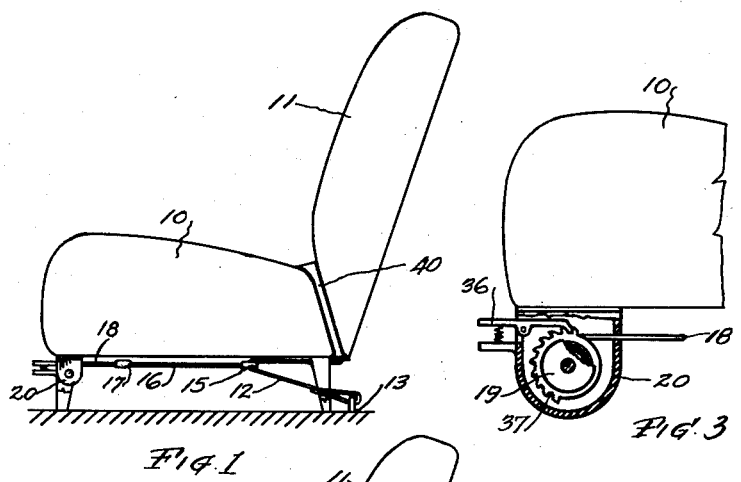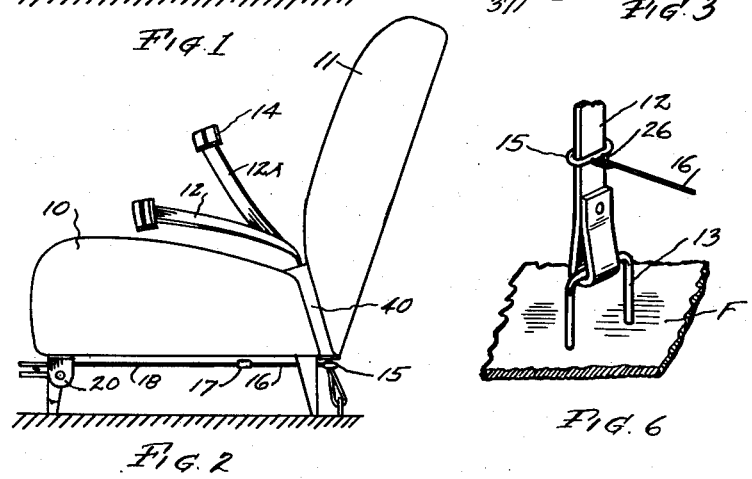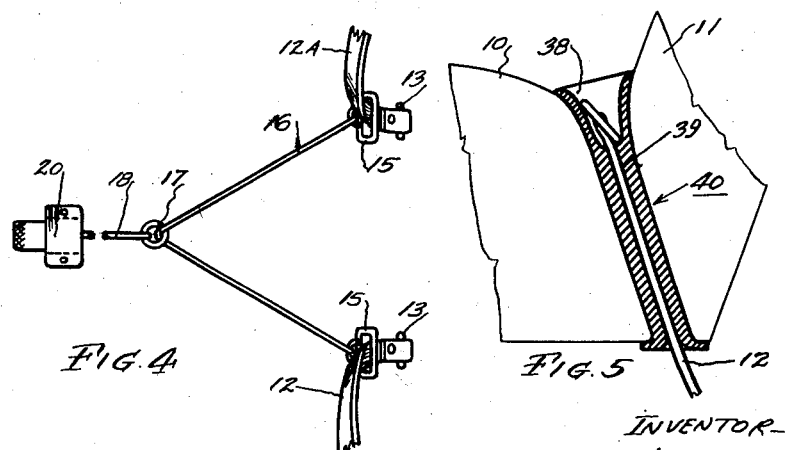

2,830,655

RETRACTABLE SAFETY BELT

Gerald Lalande, Sudbury, Ontario, Canada

Application June 18, 1956, Serial No. 592,178

3 Claims. (Cl. 155—189)

This invention relates to a retractable safety belt.

The retractable safety belt of the present invention is installed in automobiles and is associated with the front seat.

The principal object of the invention is to provide a retractable safety belt for the front seat of a four-door sedan.

Such a belt is very desirable, in that it is automatically retracted under the seat when not in use.

A specific object of the invention is to provide a safety belt for automobiles which is retracted by a spring-loaded device when desired.

Another specific object of the invention is to provide a retractable safety belt for automobiles which, when in operative position, transmits the momentum arising from a sudden decrease in speed mostly directly to the floor of the automobile.

Still another specific object of the invention is to provide a safety belt for the front seat of an automobile which is retractable, when desired, by a manually releasable spring-loaded device, without imposing any rearward pull on the body or applying tension on the two straps of the belt other than that occasioned by the tension in the straps when tied around the waist by the buckles.

In the drawings, wherein is shown the preferred form of the invention, and wherein like numerals of reference indicate corresponding parts in the various figures, Figure 1 is a side elevation of a typical automobile front seat of a typical four door sedan, showing the safety belt in retracted position;

Figure 2 is a view similar to that of Figure 1, but showing the belt in extended position ready to be fastened around the passenger's waist;

Figure 3 is an enlarged fragmentary view of Figure 1, partly in section;

Figure 4 is a more or less diagrammatic, fragmentary plan view of Figure 1 (omitting the seat);

Figure 5 is an enlarged, fragmentary view of Figure 1, partly in section; and

Figure 6 shows a detail of construction.

Referring now by numerals to the drawings, 10 and 11 indicate the seat proper and the back rest, respectively, of a typical front seat of a typical four-door sedan. The seat rests on and is suitably secured to the floor of the vehicle.

The safety belt includes two straps, 12 and 12A. The straps are anchored to the floor F as by U-bolts 13 (see Figure 6), and are provided at their free ends with conventional buckles or the like 14 (see Figure 2). The straps are anchored a suitable distance apart, say 15".

The straps are adapted to extend through the space between the adjacent or co-operating faces of the seat proper 10 and of the back rest 11, so that their free or upper ends may be attached together, as by the buckles, when one is to be secured to the seat. The momentum of the passenger, should a sudden reduction in the speed of the vehicle occur, is therefore transmitted to the floor through the belt.

In order that the straps 12 and 12A may slide easily through the space between the adjacent faces of the seat proper 10 and of the back rest 11, there are provided in the space, two elongate inserts or tubular members 40 (only one of which is shown) each formed with a channel 39 through which a strap (12 or 12A) actually passes. The cross-sectional area of the channel is chosen to accommodate the strap but not the buckle. Thus, as will be seen in Figure 5, the insert 40, which is preferably made of plastic, is flared at its upper end and formed with a recess 38 in effect providing stop means which is engaged by the buckle 14 in the retracted position of the strap. The recess serves to provide a resting place for the buckle and enables one easily to grasp it.

It is known to anchor a belt to a floor. The present invention, as already stated, is concerned with a retractable belt.

Loose on the straps 12 and 12A are elongated, substantially rectangular rings 15, the ring preferably having an integral eye 26 (see Figure 6). Tied at its opposite ends to the eyes 26 is a flexible member or cable 16 on which a ring 17 is loosely mounted.

Wound on a drum 19 rotatable in a housing 20 secured to the underside of the seat, is a cable 18, the free end of which is suitably attached to the ring 17. A spiral spring (not shown) is tensioned between the housing 20 and the drum, tending to rotate the drum in a direction (counter-clockwise, as seen in Figure 3) to wind the cable on the drum to reduce the effective or free length of the cable 18, and pull the rings 15 toward the drum and thus retract the straps (see Figure 1). Turning with the drum is a ratchet wheel 37. A spring-loaded dog 36 co-operates with the ratchet wheel normally to prevent rotation of the drum in a counter-clockwise direction, while permitting free rotation of the drum in the opposite, or clockwise direction.

The operation of the device is simple. When not in use, the belt is retracted merely by actuating the dog 36 to release the ratchet wheel 37, thus freeing the drum 19 to rotate counter-clockwise and wind the cable 18 on the drum. The free movement of the straps through the inserts is determined by the engagement of the buckles with the bottom of the recesses. When it is desired to use the belt, it is merely necessary to pull the straps upwardly, and fasten the straps around the body.

While the belt of the present invention has been shown and described herein as applied to the front seat of a four-door sedan, it is to be understood that it can be applied to the rear seat of a four-door sedan or to the front or rear seat of a coach (two-door vehicle). If the belt is to be applied to the front seat of a coach, the tubular members 40 will be suitably secured to the lower portion of the seat, and the upper enlarged portions of the members will be slightly modified so as not to impede the bodily arcual movement of the seat when swung forwardly to let a passenger into or out of the coach.

What I claim is:

1. A retractable safety belt for a vehicle comprising two straps anchored at one end to the floor of the vehicle and extending upwardly through the seat of the vehicle, a fixed drum spring-loaded to rotate in one direction, a cable having its opposite ends slidably mounted on said straps, a second cable having one end slidably mounted on said first cable intermediate the ends thereof and having its other end secured to said drum to be wound therearound when said drum is rotated in said one direction, and dog means co-operating with said drum normally preventing rotation thereof in said one direction and operable to release said drum to allow rotation thereof in said one direction.

2. A retractable safety belt as in claim 1, wherein said opposite ends are slidably mounted on said straps by means of rings loosely encompassing said straps and said rings include eyes to which the opposite ends of said first cable are tied.

3. In combination with a vehicle having a seat with a space between the adjacent faces of the seat proper and the back rest, two upwardly-directed elongate tubular members fixed in the spaced, a pair of straps passing through said tubular members, respectively, one end of each strap being anchored to the floor and the other end being provided with buckle means, said tubular members being of a cross section to allow said straps but not said buckle means to pass freely therethrough, a fixed drum spring-loaded to rotate in one direction, a cable having its opposite ends slidably mounted on said straps, a second cable having one end slidably mounted on said first cable intermediate the ends thereof and having its other end secured to said drum to be rotated therearound when said drum is rotated in said one direction, and dog means co-operating with said drum normally preventing rotation thereof in said one direction and operable to release said drum to allow rotation thereof in said one direction to pull said straps downwardly through said tubular members to retract the belt.

References Cited in the file of this patent

UNITED STATES PATENTS

| | | |
|---|---|---|
| 2,468,560 | Kirkpatrick | Apr. 26, 1949 |
| 2,480,915 | George | Sept. 6, 1949 |
| 2,488,858 | Franz | Nov. 22, 1949 |
| 2,650,655 | Neahr et al. | Sept. 1, 1953 |
| 2,716,561 | Beran | Aug. 30, 1955 |